(12) United States Patent
Bek

(10) Patent No.: US 6,554,738 B1
(45) Date of Patent: Apr. 29, 2003

(54) TRANSMISSION/ENGINE CONTROL SYSTEM FOR A MOTOR VEHICLE WITH AUTOMATIC TRANSMISSION

(75) Inventor: Manfred Bek, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/936,966
(22) PCT Filed: Feb. 26, 2000
(86) PCT No.: PCT/EP00/01618
§ 371 (c)(1), (2), (4) Date: Apr. 29, 2002
(87) PCT Pub. No.: WO00/52360
PCT Pub. Date: Sep. 8, 2000

(30) Foreign Application Priority Data

Mar. 4, 1999 (DE) .......................................... 199 09 496

(51) Int. Cl.⁷ .............................................. B60K 41/04
(52) U.S. Cl. ....................................... 477/107; 477/906
(58) Field of Search ................................. 477/906, 107

(56) References Cited

U.S. PATENT DOCUMENTS

| 4,884,669 A | | 12/1989 | Ehrlinger .................... 192/4 B |
| 4,922,769 A | * | 5/1990 | Tury ........................... 477/906 |
| 5,090,269 A | * | 2/1992 | Ohtsuka et al. ............. 477/906 |
| 5,409,434 A | * | 4/1995 | Furnkawa et al. .......... 477/130 |
| 5,460,581 A | * | 10/1995 | Ueda ........................... 477/126 |

FOREIGN PATENT DOCUMENTS

| DE | 38 27 248 A1 | 2/1989 | ........... B60K/20/02 |
| DE | 43 02 925 A1 | 8/1994 | ........... B60K/31/00 |
| DE | 44 22 257 C1 | 11/1995 | ........... F16H/59/08 |
| DE | 44 47 512 A1 | 3/1996 | ........... F16H/59/08 |
| DE | 196 43 812 A1 | 5/1998 | ........... F16H/59/08 |
| GB | 2 090 926 A | 7/1982 | ........... F16H/5/50 |
| GB | 2 315 132 A | 1/1998 | ........... F16H/61/12 |
| JP | 03061760 A | 3/1991 | ........... F16H/61/12 |
| JP | 05322031 A | 12/1993 | ........... F16H/61/12 |
| JP | 05272633 A | 1/1994 | ........... F16H/61/12 |
| WO | 93/13340 | 7/1993 | ........... F16H/61/12 |

OTHER PUBLICATIONS

Uffer, Kurt, "Elektronische Getriebesteuerung von Bosch", *ATZ Autmobiltechnische Zeitschrift* 94 92) 9, pp. 442–449.

* cited by examiner

*Primary Examiner*—Dirk Wright
(74) *Attorney, Agent, or Firm*—Davis & Bujold, P.L.L.C.

(57) ABSTRACT

A transmission/engine control (1) for a motor vehicle with an automatic transmission (2) having a warning apparatus (3) for a disturbance of a signal transmission from an electrical position recognition apparatus (4) of a selection lever (5) which acts on the regulating device of the automatic transmission, via an electronic transmission control. The warning apparatus (3) has the purpose of notifying the driver that no further change in the direction of travel can be executed and the warning apparatus (3) coacts with a program module of a transmission independent processing unit (6) which, upon occurrence of the disturbance of the signal transmission, initiates an emergency operating mode of the automatic transmission (2) and determines a vehicle speed which is less than a specified threshold value. The processing unit (6) communicates a maximum allowable motor torque and/or a maximal allowable motor speed of rotation to a program module of a motor control (7). Alternatively, the warning apparatus (3) can provide a signal to a control apparatus (10) of a vehicle brake system for the activation of the brake system or signal to a locking apparatus (12) to lock the selection lever in its existing position, or the warning apparatus can provide the driver with an optical or an acoustic advisory indication.

14 Claims, 1 Drawing Sheet

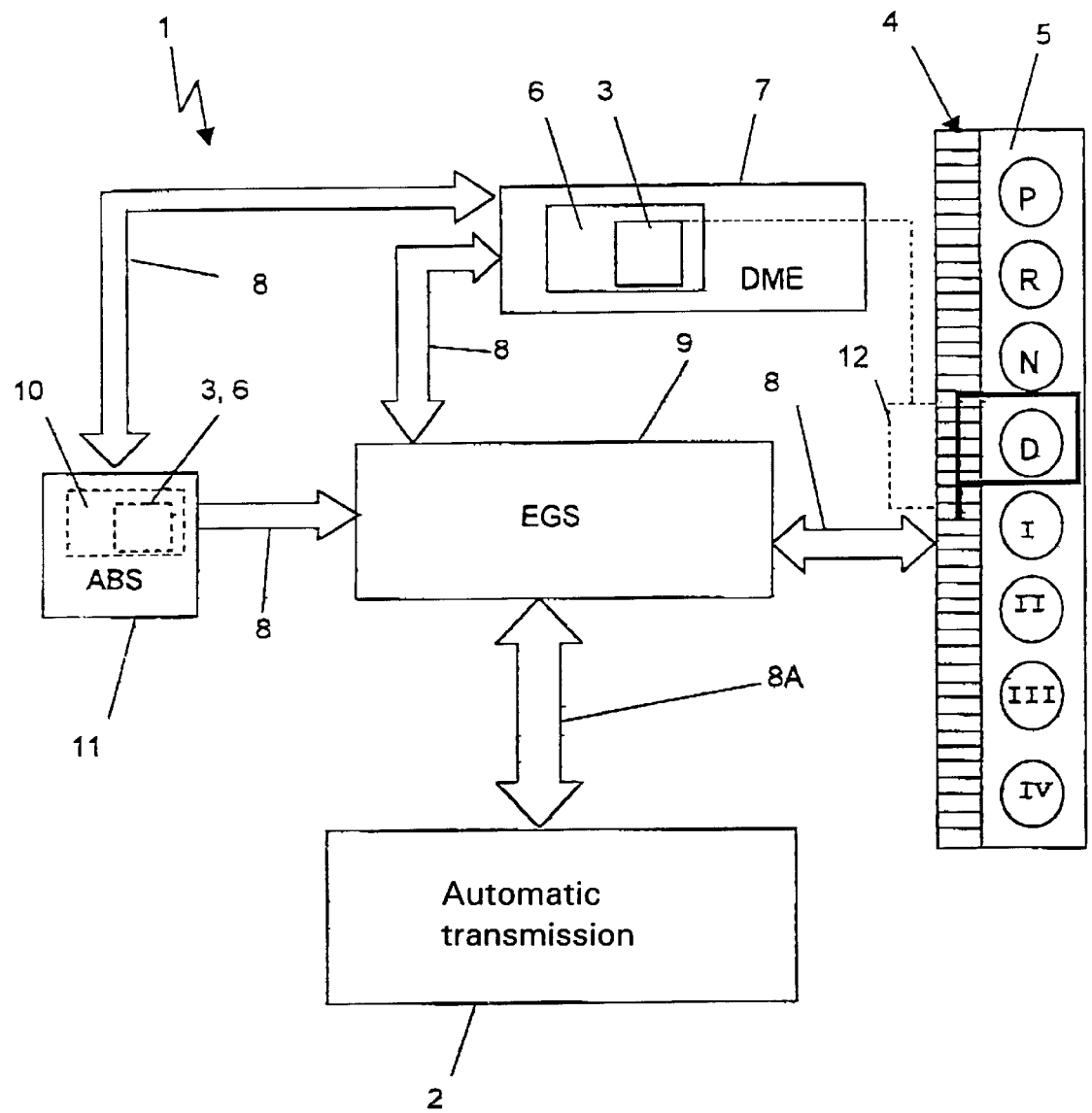

TRANSMISSION/ENGINE CONTROL SYSTEM FOR A MOTOR VEHICLE WITH AUTOMATIC TRANSMISSION

FIELD OF THE INVENTION

The invention concerns a transmission/engine control for a motor vehicle with an automatic transmission in accord with such a control more closely defined in the generic concept of the present patent.

BACKGROUND OF THE INVENTION

As taken from the state of the technology in the known transmission control for an automatic transmission of a motor vehicle that possesses an electrical circuitry, the placement of gear ratio position is initiated by the options of a driver. The driver accomplishes this by means of activating a gear selection lever, wherein the position of the lever is detected by a position recognition apparatus which sends a corresponding signal to an electronic transmission control.

Should a disturbance occur in a signal transmission along the signal pathway between the gear selection lever and the control of the automatic transmission, then an emergency operating mode is activated in order to allow the automatic transmission to run a hydraulic emergency program. A disturbance can come about through a dropout of a data bus of a Controller Area Network (hereinafter, "CAN") or in the failure of an electronic control device, such as the electronic transmission control.

In the case of a disturbance, as a result of the then activated emergency operating mode, no further alteration of the driving program in the automatic transmission is possible, except for stopping the motor. Normally, one gear stage becomes hydraulically fixed in an emergency operating mode. It is impossible for the driver to change this situation by manipulating the position of the gear selection lever since, firstly, the electro-hydraulic actuator for the clutch control can no longer be regulated electrically and, secondly, the electrical position recognition impulses can no longer be transmitted.

The latter, relating to the position recognition apparatus, is especially problematic in the case of an automatic transmission with an exclusively electrical connection between the gear selection lever and the transmission.

For example, DE-OS 196 43 812 describes a parking-block system for an automatic transmission in which the gear selection lever is completely uncoupled and the control demands of the lever are exclusively taken over by the electronic transmission control.

DE-PS 44 22 257 describes a gear selection apparatus for an automatic transmission wherein the stages "D", "N", and "R" are exclusively shifted in by an electric motor which is controlled by an electronic transmission regulatory apparatus. In this arrangement, only in the gear selection stage "P" would the mechanical-hydraulic coaction between the gear selection lever and the transmission be initiated.

If, by the occurrence of a disturbance of the signal transmission, a gear position for forward travel is shifted, and the driver, by means of the gear selection lever, gives the command for change to a reverse gear, this shifting order cannot be transmitted to the transmission control and carried out and the vehicle, upon starting from rest, disadvantageously travels forward contrary to the expectation of the driver.

In order to alert the driver that the automatic transmission is in the emergency mode, as advised by the state of the technology, the instrument board of the motor vehicle is provided with a warning element or a light signal to indicate such disturbance. Further, another known procedure is to notify the driver of an activation of the emergency mode by the extinguishing of a normally illuminated display of the gear selection position display on the instrument board or elsewhere, which is in electrical communication with the electronic transmission control.

However, this arrangement is disadvantageous because these warning displays only indicate a general emergency condition so that the driver can come to a false conclusion about carrying out a change in the direction of driving.

This can lead to a situation wherein, after a driver's movement of a gear selection lever to change the travel direction of the vehicle from a "FORWARD" gear selection to "REVERSE", the vehicle itself moves in a "false" direction upon starting.

Upon a strong activation of the gas pedal, the motor vehicle can then run into an obstruction in the vicinity since, in such an occurrence, the reaction time in which the driver has available to evaluate the situation can be too short to avoid an accident by subsequent activation of the vehicle brake. Thus, the present invention has the purpose of making available a transmission/engine control for a motor vehicle with an automatic transmission and an electrical position recognition of the placement of gear selection lever with which, in the case of a disturbance of the signal transmission between the gear selection lever and transmission and in an activated emergency mode, the danger of accident by undesired starting from rest in a "false" direction is avoided, or at least a start of motion with only a low acceleration is possible.

In accord with the invention, this purpose is achieved with a transmission/engine control as discussed below.

SUMMARY OF THE INVENTION

When the invented transmission/engine control is constructed, assurance is advantageously given that in the case of a disturbance of a signal transmission from the electrical position recognition apparatus of the gear selection lever to the control means of the automatic transmission, by means of which a disturbance in a direction of travel change can no longer be carried out, and only a slow startup of the motor vehicle is possible.

This is of particular advantage, if the driver of the motor vehicle is of the opinion that he has effected a change in a direction of travel by means of activation of the gear selection lever whereby the fact is that, because of the disturbance, no change of the existing gear stage occurred. With the achievement in accord with the invention, namely, the motor vehicle does not travel with its entire available motor capacity, but only with a lesser motor capacity, so the driver has sufficient time and is able to avoid damage to his motor vehicle.

Alternative to this, the transmission/engine control can be so designed that with this achievement of the purpose of the invention, in a simple manner assurance can be given that in the case of a disturbance of the signal transmission from the electrical position recognition apparatus of the gear selection lever to the regulatory means of the automatic transmission, by which no change in the direction of travel is possible, a driver can start up from still stand with the motor vehicle, having no acceleration, or with only a reduced acceleration, that is, the vehicle speed, in what is for him a "false" direction.

By means of the activation of the vehicle brakes, in an advantageous manner, an accident can be avoided. To accomplish this, the vehicle brakes can be activated by a processing unit, independent of the transmission, in such a manner that a startup of the motor vehicle is in general prevented, or is possible only at a very slow speed.

With the invented achieving of the purpose of the invention which, in itself alone, or in combination with one of the achievements, provision can be made to achieve the advantage that the driver of a motor vehicle can be advised, through the blocked gear selection lever, that a change in the direction of the travel by means of a change of the gear selection in the automatic transmission is not possible. This would indicate that forward travel, subsequent to reverse travel, is not possible. This invented advantage provides the driver with a clear, and unmistakable announcement, that a change of the travel direction is not possible.

An optical or acoustic advisory display presents a constructive, simple and economical advantage of the invention which can be installed on the instrument panel.

In a development of the transmission/engine control, it can be provided that the warning apparatus is at least activated for a specific time of application.

To accomplish this, advantageously the driver is first signaled that a disturbance is in force and a travel directional change of the motor vehicle is not possible. After expiration of the time of application, the motor related or brake related operational intervention can, in part, be rescinded by the warning so that a larger vehicle mobility is made available and a limited continuation of travel to a repair station is assured. This travel would take place in a hydraulic emergency mode of the automatic transmission without markedly increasing the safety risks to the driver.

Further advantages and improvements of the invention arise with the aid of the drawing, showing a sketch schematically based on the described embodiment.

BRIEF DESCRIPTION OF THE DRAWING

The invention will now be described, by way of example, with reference to the accompanying drawings in which:

FIG. 1 is a schematic block-drawing of a transmission/engine control for an automatic transmission.

DETAILED DESCRIPTION OF THE INVENTION

The single Figure of the drawing shows a very schematized block-circuit drawing of a transmission/engine control 1 for an automatic transmission 2 of a motorized vehicle, not further described, whereby one warning apparatus 3 is provided which displays a disturbance of an electrical position recognition apparatus 4 of a gear selection lever 5 on a control means (not more thoroughly described) of the automatic transmission. By means of the selection lever 5, several gear stages P, R, N, DI, II, III, IV can be chosen by a driver and electrically initiated.

The warning apparatus 3 incorporates a program module of a processing unit 6 which is independent of the transmission. Under emergency drive conditions affecting the automatic transmission 2, upon the recognition of a vehicle speed, which is less than a specified threshold, the warning apparatus 3 signals to a program module functioning in a motor control 7. The motor control 7 is designed to coact within a Digital Motor Electronic apparatus, and determines a maximum allowable motor torque and/or a maximum allowable rate of rotation for the motor for an emergency state operation. The transmission independent processing unit 6, in the embodiment shown in the figure, is simultaneously a computer for the motor control 7.

In another embodiment of the present invention, not illustrated, the processing unit 6, which is independent of the transmission, can also be designed as a separate control apparatus.

The automatic transmission 2 is connected by line 8A with an electronic transmission control unit 9 designated as "EGS" in the figure. This connection is especially for the sending electrical control commands for hydraulic transmission regulation. The position recognition apparatus 4 is connected to the transmission control equipment 9 by means of a CAN data bus 8. For communication with other control units of the vehicle, such as a control apparatus 10 regulating the vehicle brakes, the electronic transmission control 9 is likewise connected to these by means of a CAN data bus 8.

In an alternative embodiment, the electrical signal transmission between the electronic control units 6, 7, 9, 10 can be carried out among one another and for the position recognition apparatus 4 through a single cable.

A disturbance of the signal transmission from the position recognition apparatus 4 to the control elements of the automatic transmission 2 can take place by a disturbance or a dropout of the electrical transmission control 9 and/or the CAN data buses 8 and/or the position recognition apparatus 4. Under these conditions, the emergency running mode is initiated by the electronic transmission control equipment 9. The hydraulic control equipment in the automatic transmission 2 (not shown in more detail) activates the emergency mode program so that the motor vehicle can be driven further, at least in a limited way.

The warning apparatus 3 recognizes the emergency mode operation by the lack of a signal from the electronic transmission control 9, which signal denotes normal operation.

If the driver of the motor vehicle, by means of the placement of the gear selection lever 5 of the position recognition apparatus 4, sends a command for a change of a direction of travel or to change the existing driving program, for instance, from "D" to "I", in the normal manner of functioning the transmission/engine control, the chosen direction of travel, or the chosen running program is set into the automatic transmission.

In the case of a disturbance in the signal transmission and the resulting emergency operational mode, an alteration of the position of the gear selection lever 5 is no longer recognized. If the driver would now change the selection lever 5 from a position for forward travel D to a position R, i.e. reverse, the motor vehicle would, nevertheless, continue in its program for forward motion.

The warning apparatus 3 sends to the motor control 7 commands for a maximum allowable motor torque and/or a maximum allowable speed of rotation. In this way, the motor vehicle can drive forward only at a markedly diminished acceleration, with a greatly reduced traction and at a reduced speed. The quantitative value of the torque and/or rotational rate is to be applied correspondingly, as provided in the present embodiment, in such a manner that the vehicle can move itself only at a creeping speed, that is at 8 km/h.

In the case of a disturbance of the signal transmission, a further possibility for limiting the speed of the vehicle or the acceleration during starting from a rest position, is obvious in an embodiment presented in dotted lines in the figure, in which the warning apparatus 3, with its transmission independent processing unit 6, emits a signal to a program module of a control apparatus 10 related to the vehicle brake system for activation of the brakes (not shown). The processing unit 6, independent of the transmission, coacts with a processor of the control apparatus 10 of the vehicle brakes, which is integrated into the shown part of an anti blocking system 11.

With these variants in construction, it is likewise assured that the motor vehicle starts at a much reduced acceleration or can only be moved at low speed. It lies within the realm of the expert to provide the gripping power of the brakes by the vehicle braking system so that starting of the vehicle from rest is, in general, prevented.

In a further variant of an embodiment, denoted in the drawing by dotted lines, provision has been made that the warning apparatus 3, co-acting with a locking device 12 to block the gear selection lever 5, so that the selection-lever is fixed in its existing position upon occurrence of the disturbance. In this way, the driver can no longer activate the selection lever 5 and this situation confirms, that a change of the driving program is no longer possible.

The locking apparatus 12 is constructed as an electro-magnet or permanent magnet which fixes the selection lever in its actual position.

In the above embodiment example, the manner of functioning of the transmission/engine control, in accord with the invention in the case of a signal transmission disturbance and release of the emergency operational mode, is for a forward travel motion. Obviously, this is also analogous to a signal transmission disturbance and release of the emergency operational mode during travel in a reverse direction.

In this case, for instance, the locking apparatus 12 blocks the selection lever in the position "R". The described motor side and brake side actions are independent of the selection lever position. The automatic transmission 2 remains hydraulically fixed in the reverse gear, at least for such a time as no system reset is carried out by the shutting off of the ignition current.

Reference Numbers 1 transmission/engine control system
2 automatic transmission
3 warning program module
4 position recognition apparatus
5 selection lever
6 processor unit, independent of transmission
7 digital motor electronics
8 controller area network
8A signal bus lines
9 electronic transmission control equipment
10 control unit of vehicle brake
11 vehicle braking system ABS anti-blocking-system
12 locking apparatus
P park position of selector
R reverse position of selector
N neutral position of selector
D drive position of selector
I first gear forward
II second gear forward
III third gear forward
IV fourth gear forward

What is claimed is:

1. A transmission/engine control for a motor vehicle with an automatic transmission, the transmission/motor control having a warning apparatus (3) for indicating a disturbance of a signal transmission from a position recognition apparatus (4) of a selector lever (5), by which a desired one of a plurality of gear positions (P, R, N, D, I, II, III, IV) can be selected by a driver, the selector lever (5) acting through an electronic transmission control on a regulating means of the automatic transmission;

wherein the warning apparatus (3), in order to indicated that a change in a travel direction no longer can occur, has a program module of a transmission independent processing unit (6), and said processing unit (6), upon occurrence of said disturbance of the signal transmission, initiates an emergency operating mode of the automatic transmission (2) determines a vehicle speed for the vehicle, which is less than a threshold value, and communicates to at least one of a maximum allowable motor torque, a maximum allowable motor speed of rotation and a maximum allowable vehicle speed to a program module of a motor control (7) for the emergency operating mode of the vehicle.

2. A transmission/engine control for a motor vehicle with an automatic transmission, the transmission/motor control having a warning apparatus (3) for indicating a disturbance of a signal transmission from a position recognition apparatus (4) of a selector lever (5), by which a desired one of a plurality of gear positions (P, R, N, D, I, II, III, IV) can be selected by a driver, the selector lever (5) acting through an electronic transmission control on a regulating means of the automatic transmission;

wherein the warning apparatus (3), in order to indicate that a change in travel direction no longer can be executed, has a program module of a transmission independent processing unit (6), and said processing unit (6), upon occurrence of said disturbance of the signal transmission, initiates an emergency operating mode of the automatic transmission (2) and determines a vehicle speed, which is less than a threshold value, and sends a signal to a program module of a control apparatus (10) for activation of a vehicle braking system of the vehicle.

3. A transmission/engine control for a motor vehicle with an automatic transmission, the transmission/motor control having a warning apparatus (3) for indicating a disturbance of a signal transmission from a position recognition apparatus (4) of a selector lever (5), by which a desired one of a plurality of gear positions (P, R, N, D, I, II, III, IV) can be selected by a driver, the selector lever (5) acting through an electronic transmission control on a regulating means of the automatic transmission;

wherein the selector lever (5) includes a locking device (12), and the warning apparatus (3), in order to indicated that a change in travel direction change no longer can be executed, interacts with the locking device (12) which locks the selector lever (5) in its existing position, upon occurrence of the disturbance of a signal transmission, during for the emergency operating mode of the automatic transmission (2).

4. The transmission/engine control for a motor vehicle with an automatic transmission according to claim 1, wherein the warning apparatus (3) has one of an optical advisory apparatus and an acoustic advisory apparatus which notifies the driver by one of an optical signal and an acoustic signal, upon initiation of the emergency operating mode of the automatic transmission (2) due to the occurrence of the disturbance of the signal transmission, that the change in travel direction no longer can be executed.

5. The transmission/engine control for a motor vehicle with an automatic transmission according to claim 1, wherein, in the case of one of:

a disturbance, a dropout of an electronic transmission control apparatus (9), a dropout of a CAN-data base, and a dropout of the position recognition apparatus (4) of the selector lever (5), the application of the emergency operating mode is made known.

6. The transmission/engine control for a motor vehicle with an automatic transmission according to claim 1, wherein the electronic transmission controller normally outputs an output signal which denotes normal operation, and the emergency operating mode is recognized when the warning apparatus (3) indicates an absence of the output signal outputted by the electronic transmission controller.

7. The transmission/engine control for a motor vehicle with an automatic transmission according to claim 1, wherein the warning apparatus (3) remains active at least for a predetermined period after the occurrence of the disturbance and operation under the emergency operating mode of the vehicle.

8. The transmission/engine control for a motor vehicle with an automatic transmission according to claim 1, wherein the transmission independent processing unit (6), in which the program module of the of the warning apparatus (3) is integrated, is a separate processor.

9. The transmission/engine control for a motor vehicle with an automatic transmission according to claim 1, wherein the transmission independent processing unit (6), in which the program module of the of the warning apparatus (3) is integrated, is a component of the motor control (7).

10. The transmission/engine control for a motor vehicle with an automatic transmission according to claim 1, wherein the transmission independent processing unit (6), in which the program module of the of the warning apparatus (3) is integrated, is a component of the control apparatus (10) of the vehicle brake system.

11. The transmission/engine control for a motor vehicle with an automatic transmission according to claim 1, wherein at least one of:
   the maximum motor torque;
   the maximum motor speed; and
   activation of the braking of the vehicle brake system is provided in such a manner that the vehicle speed, upon startup from rest, while in the emergency operating mode, corresponds to a creeping velocity of the vehicle.

12. The transmission/engine control for a motor vehicle with an automatic transmission according to claim 2, wherein the vehicle brakes are electrically controlled.

13. The transmission/engine control for a motor vehicle with an automatic transmission according to claim 3, wherein the locking device (12) is a magnet which, when supplied with electrical current, fixes the selector lever (5) in its existing position.

14. The transmission/engine control for a motor vehicle with an automatic transmission according to claim 3, wherein the locking device (12) is constructed as a magnet which, when a supplied of electrical current thereto is interrupted, fixes the selector lever (5) in its existing position.

* * * * *

UNITED STATES PATENT AND TRADEMARK OFFICE
CERTIFICATE OF CORRECTION

PATENT NO.     : 6,554,738 B1
DATED          : April 29, 2003
INVENTOR(S)    : Manfred Bek It is certified that error appears in the above-identified patent and that said Letters Patent is hereby corrected as shown below:

<u>Title page,</u>
Item [86], replace "(2), (4) Date: Apr. 29, 2002" with -- (2), (4) Date: Nov. 01, 2001 --.

Signed and Sealed this

Second Day of March, 2004

JON W. DUDAS
*Acting Director of the United States Patent and Trademark Office*